(12) United States Patent
Nishio et al.

(10) Patent No.: US 12,421,768 B2
(45) Date of Patent: Sep. 23, 2025

(54) VEHICLE

(71) Applicant: TOYOTA JIDOSHA KABUSHIKI KAISHA, Toyota (JP)

(72) Inventors: Yoshifumi Nishio, Okazaki (JP); Kodai Taneda, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 390 days.

(21) Appl. No.: 18/199,083

(22) Filed: May 18, 2023

(65) Prior Publication Data
US 2023/0392417 A1    Dec. 7, 2023

(30) Foreign Application Priority Data

Jun. 7, 2022   (JP) ................. 2022-092462

(51) Int. Cl.
| | | |
|---|---|---|
| *E05B 79/02* | (2014.01) | |
| *B60K 11/00* | (2006.01) | |
| *B62D 25/08* | (2006.01) | |
| *B62D 25/10* | (2006.01) | |
| *E05B 83/24* | (2014.01) | |

(52) U.S. Cl.
CPC .............. *E05B 79/02* (2013.01); *B60K 11/00* (2013.01); *B62D 25/084* (2013.01); *B62D 25/105* (2013.01); *E05B 83/243* (2013.01)

(58) Field of Classification Search
CPC ....... E05B 79/02; E05B 83/243; B60K 11/00; B62D 25/084; B62D 25/105
See application file for complete search history.

(56) References Cited

U.S. PATENT DOCUMENTS

| | | | | |
|---|---|---|---|---|
| 7,150,335 B2 * | 12/2006 | Sasano | ................. | B62D 25/084 |
| | | | | 165/41 |
| 7,914,071 B2 * | 3/2011 | Saitou | .................. | B62D 25/084 |
| | | | | 70/240 |
| 10,696,254 B2 * | 6/2020 | Nakamoto | .............. | B60R 19/34 |
| 11,235,815 B2 * | 2/2022 | Saeki | ................... | B62D 25/084 |

FOREIGN PATENT DOCUMENTS

| | | | | |
|---|---|---|---|---|
| CN | 101402373 A | * | 4/2009 | |
| JP | 2002-160667 A | | 6/2002 | |
| JP | 2003-306168 A | | 10/2003 | |
| JP | 2008001154 A | * | 1/2008 | |
| JP | 2011-184016 A | | 9/2011 | |
| JP | 2021075094 A | * | 5/2021 | |

* cited by examiner

*Primary Examiner* — Faye M Fleming
(74) *Attorney, Agent, or Firm* — Dinsmore & Shohl LLP

(57) ABSTRACT

A vehicle disclosed in the present specification includes a vehicle body that has a front compartment, a radiator that is disposed in the front compartment, a radiator support upper crossmember that makes up part of the vehicle body and that also extends in a right-left direction along an upper edge of the radiator, a hood that is pivotably linked to the vehicle body and that is movable between an open position for opening the front compartment and a closed position for closing the front compartment, and a hood lock that is fixed to the radiator support upper crossmember and that also locks the hood in the closed position. The hood lock is positioned rearward of a center of the radiator support upper crossmember in a front-rear direction.

7 Claims, 4 Drawing Sheets

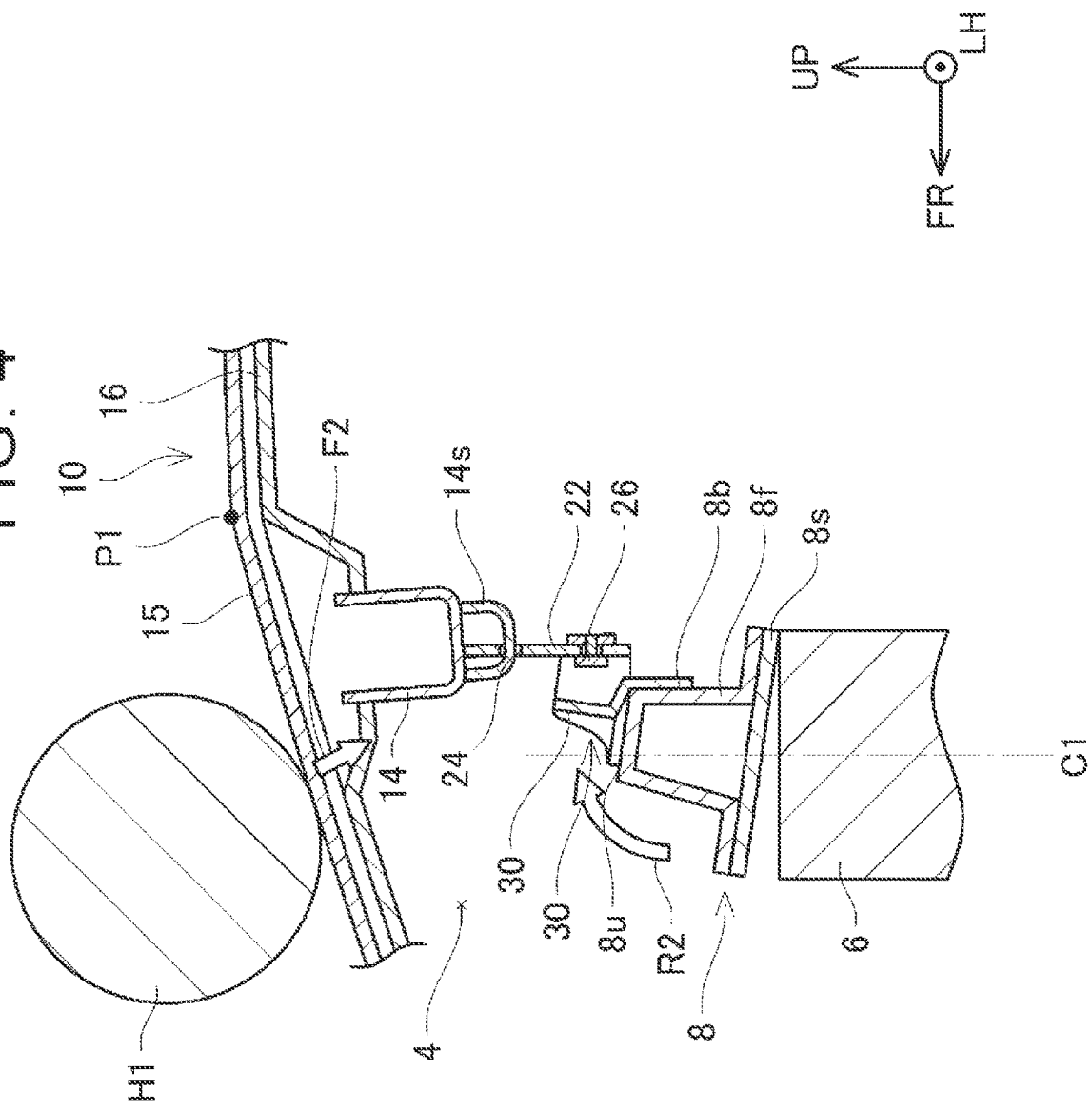

VEHICLE

CROSS-REFERENCE TO RELATED APPLICATION

This application claims priority to Japanese Patent Application No. 2022-092462 filed on Jun. 7, 2022, incorporated herein by reference in its entirety.

BACKGROUND

1. Technical Field

The technology disclosed in the present specification relates to a vehicle.

2. Description of Related Art

Japanese Unexamined Patent Application Publication No. 2002-160667 (JP 2002-160667 A) discloses a vehicle including a vehicle body having a front compartment, a hood for opening and closing the front compartment, a radiator disposed in the front compartment, a radiator support extending in a right-left direction along an upper edge of the radiator, and a hood lock that locks the hood in a closed position of the front compartment.

SUMMARY

There is known a vehicle crash test in which a spherical test device (impactor) is made to collide with a hood, and collision reaction force acting on the test device is measured. In this test, reduction in the collision reaction force acting on the test device is required. However, the presence of the hood lock on a rear face of the hood when the test device is made to collide with the hood causes the collision reaction force that is measured to be relatively large. The present specification provides a new technology that is capable of reducing such a phenomenon.

A vehicle disclosed in the present specification includes: a vehicle body that includes a front compartment; a radiator that is disposed in the front compartment; a radiator support upper crossmember that makes up part of the vehicle body and that also extends in a right-left direction along an upper edge of the radiator; a hood that is pivotably linked to the vehicle body and that is movable between an open position for opening the front compartment and a closed position for closing the front compartment; and a hood lock that is fixed to the radiator support upper crossmember and that also locks the hood in the closed position. The hood lock is positioned rearward of a center of the radiator support upper crossmember in a front-rear direction.

In an arrangement in which the hood lock is present on the rear face of the hood when the test device is made to collide against the hood, a collision load is conveyed through the hood to the hood lock. Although the hood lock is fixed to the radiator support upper crossmember, the hood lock is offset rearward in the front-rear direction with respect to the radiator support upper crossmember extending in the right-left direction. Accordingly, the collision load conveyed to the hood lock displaces the hood lock so that the hood lock is tilted rearward. As a result, the reaction force acting on the hood from the hood lock, i.e., the collision reaction force measured by the test device, is reduced.

Details and further improvements of the technology disclosed in the present specification will be described in the "DETAILED DESCRIPTION OF EMBODIMENTS" section below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a cross-sectional view similar to FIG. 3, illustrating when a collision test is performed on the vehicle 100 according to the embodiment.

DETAILED DESCRIPTION OF EMBODIMENTS

In an embodiment of the present technology, the hood lock may be fixed to a rear face of the radiator support upper crossmember via a bracket plate. According to such a configuration, when a load is applied to the hood lock obliquely in a vehicle-rearward direction with respect to a downward direction, the bracket plate of the hood lock readily separates from the rear face of the radiator support upper crossmember. As a result, collision reaction force measured by a test device can be further reduced.

In an embodiment of the present technology, the bracket plate may include a main unit that extends in an up-down direction, and a pair of extending portions in which one of the extending portions extends forward from the main unit on one side of the hood lock in the right-left direction and another one of the extending portions extends forward from the main unit on another side of the hood lock in the right-left direction. In this case, the extending portions may be fixed to an upper face of the radiator support upper crossmember. The hood applies a load to the hood lock from above when moving to the closed position. According to such a configuration, the extending portions convey the load when the hood is closed to the upper face of the radiator support upper crossmember. As a result, durability with respect to the load when the hood is closed can be improved.

In an embodiment of the present technology, the main unit of the bracket plate may include a first region that is fixed to the rear face of the radiator support upper crossmember, a second region that is positioned above the first region and also to which the hood lock is fixed, and an inclined portion interposed between the first region and the second region. The inclined portion may be displaced forward the further toward the second region such that the second region is positioned above the radiator support upper crossmember. The extending portions may extend from the second region to the upper face of the radiator support upper crossmember. According to such a configuration, the inclined portion conveys the load when the hood is closed to the upper face of the radiator support upper crossmember. As a result, durability with respect to the load when the hood is closed can be improved.

In an embodiment of the present technology, the radiator support upper crossmember may include a first member with a hat-shaped cross-section, a bottom of the first member being open, and a second member closing the hat-shaped cross-section from below the first member. According to such a configuration, the radiator support upper crossmember has a closed cross-sectional shape. As a result, rigidity of the radiator support upper crossmember can be improved, and the durability with respect to the load when the hood is closed can be improved.

Embodiment

Figure 1:
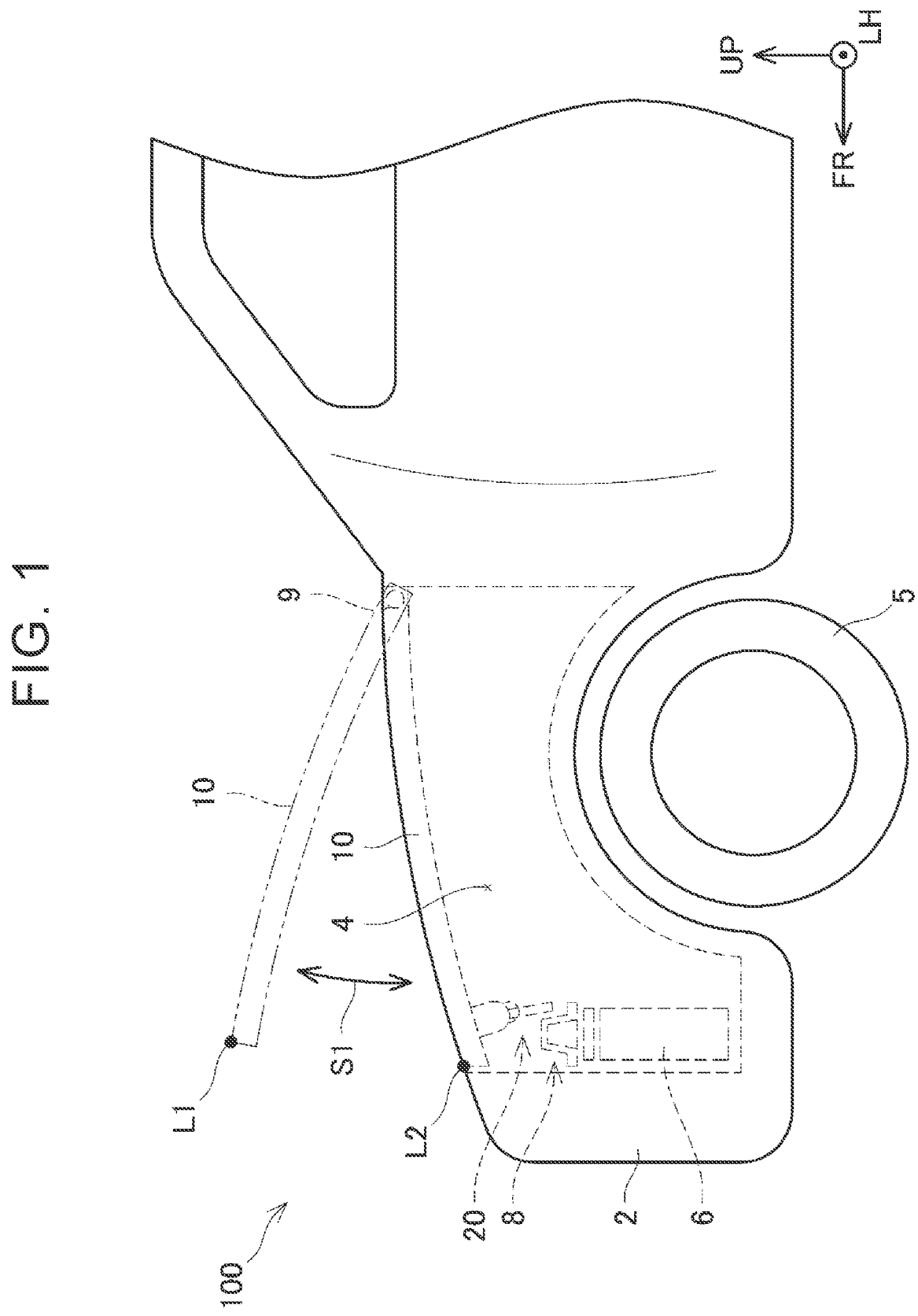
FIG. 1 is a side view of a front portion of a vehicle 100 according to an embodiment.

FIG. 1 is a side view of a front portion of a vehicle 100 according to an embodiment. The vehicle 100 includes a vehicle body 2, front wheels 5, a radiator 6, a hood 10, and a hood lock module 20. The vehicle 100 is, for example, a battery electric vehicle. "FR" in the coordinate system in FIG. 1 indicates a vehicle-forward direction. "UP" indicates a vehicle-upward direction. "LH" indicates "left" when viewing forward from a rearward side of the vehicle. The meanings of the axes in the coordinate system are the same in the following drawings as well.

A front compartment 4 is provided in a front portion of the vehicle body 2. The front compartment 4 is a space that accommodates various types of equipment of the vehicle 100. The hood 10 is disposed upward from the front compartment 4. The hood 10 is linked to the vehicle body 2, so as to be pivotable about a hinge 9 in directions indicated by arrow S1. Accordingly, the hood 10 can move between an open position L1 and a closed position L2. When the hood 10 is positioned at the open position L1, an upper part of the front compartment 4 is opened. When the hood 10 is positioned at the closed position L2, the upper part of the front compartment 4 is closed.

The radiator 6 and the hood lock module 20, for example, are accommodated in the front compartment 4 of the vehicle 100 according to the present embodiment. The radiator 6 is equipment for cooling, for example, a traction motor and a power converter (both omitted from illustration) of the vehicle 100. The radiator 6 is fixed in the front compartment 4 by a radiator support upper crossmember 8. The radiator support upper crossmember 8 is a member that extends through the front compartment 4 in the right-left direction (i.e., in a near-side-far-side direction as to the plane of the drawing in FIG. 1). The ends of the radiator support upper crossmember 8 in the right-left direction are each linked to side walls of the front compartment 4 (i.e., the vehicle body 2). That is to say, the radiator support upper crossmember 8 makes up part of the vehicle body 2. The hood lock module 20 is a mechanism for locking the hood 10 in the closed position L2. The hood lock module 20 is disposed above the radiator support upper crossmember 8.

Figure 2:
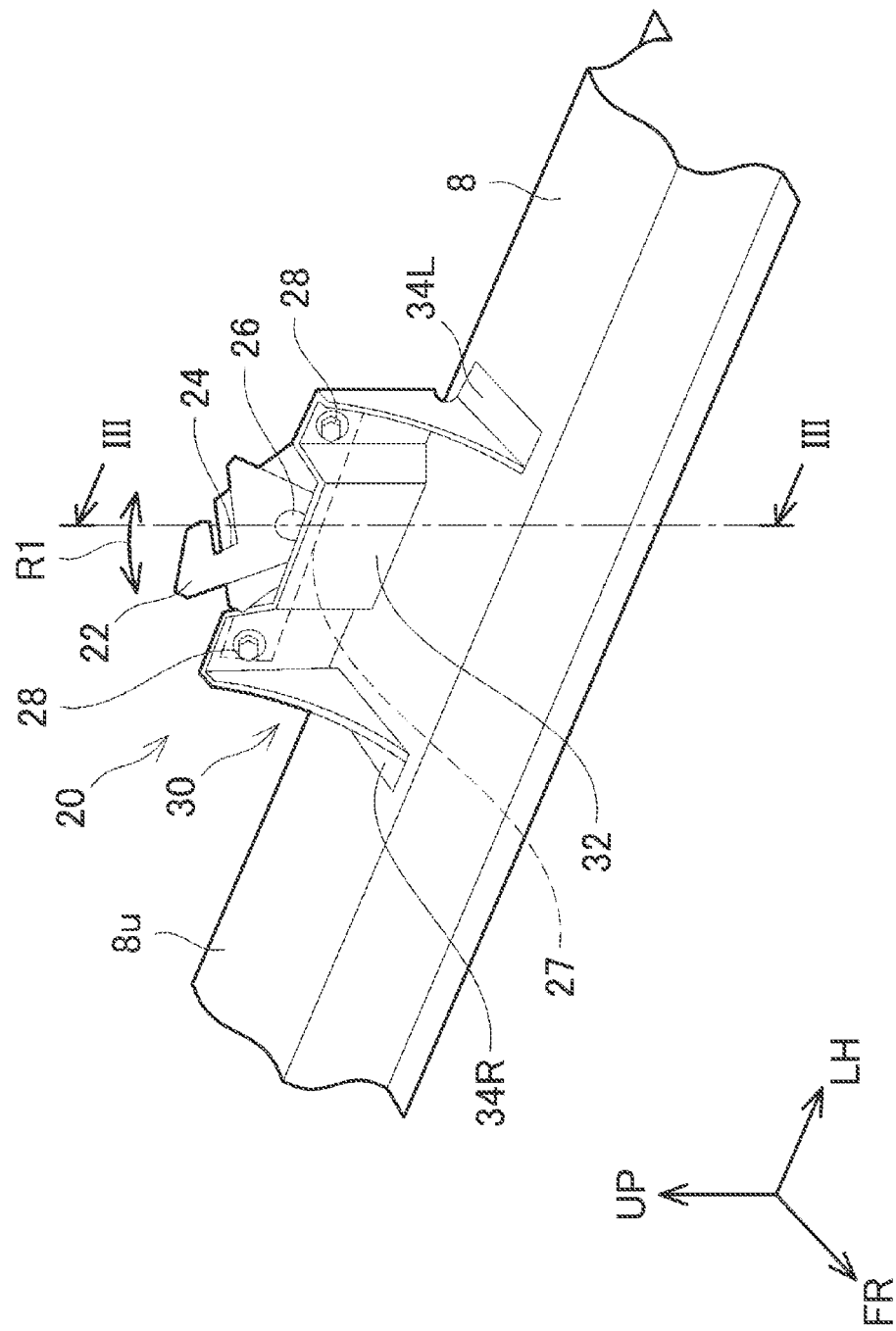
FIG. 2 illustrates a perspective view of a vicinity of a hood lock module 20.

Detailed structures of the radiator support upper crossmember 8 and the hood lock module 20 will be described with reference to FIGS. 2 and 3. FIG. 2 is a perspective view of a vicinity of the hood lock module 20 in the front compartment 4. The hood lock module 20 includes a hood lock 22, a base plate 27, a bracket plate 30, and a pin 26. A notch 24 is formed in the hood lock 22. The hood lock 22 is turnably linked to the base plate 27 by the pin 26. The base plate 27 is fixed to the bracket plate 30 by two screws 28. Thus, the hood lock 22 turns about the pin 26, as indicated by arrow R1.

The bracket plate 30 includes a main unit 32 and a pair of extending portions 34L, 34R. The main unit 32 of the bracket plate 30 extends in an up-down direction, and also protrudes forward (i.e., leftward in the plane of the drawing in FIG. 2) at the middle portion thereof in the right-left direction. One of the extending portions 34L, 34R is positioned on one side of the main unit 32 in the right-left direction and another one of the extending portions 34L, 34R is positioned on the other side of the main unit 32 in the right-left direction. One of the extending portions 34L, 34R extends forward from one end of the main unit 32 in the right-left direction and another one of the extending portions 34L, 34R extends forward from the other end of the main unit 32 in the right-left direction. The extending portions 34L, 34R have mutually symmetrical shapes. Lower ends of the extending portions 34L, 34R are fixed to an upper face 8u of the radiator support upper crossmember 8 by welding.

Figure 3:
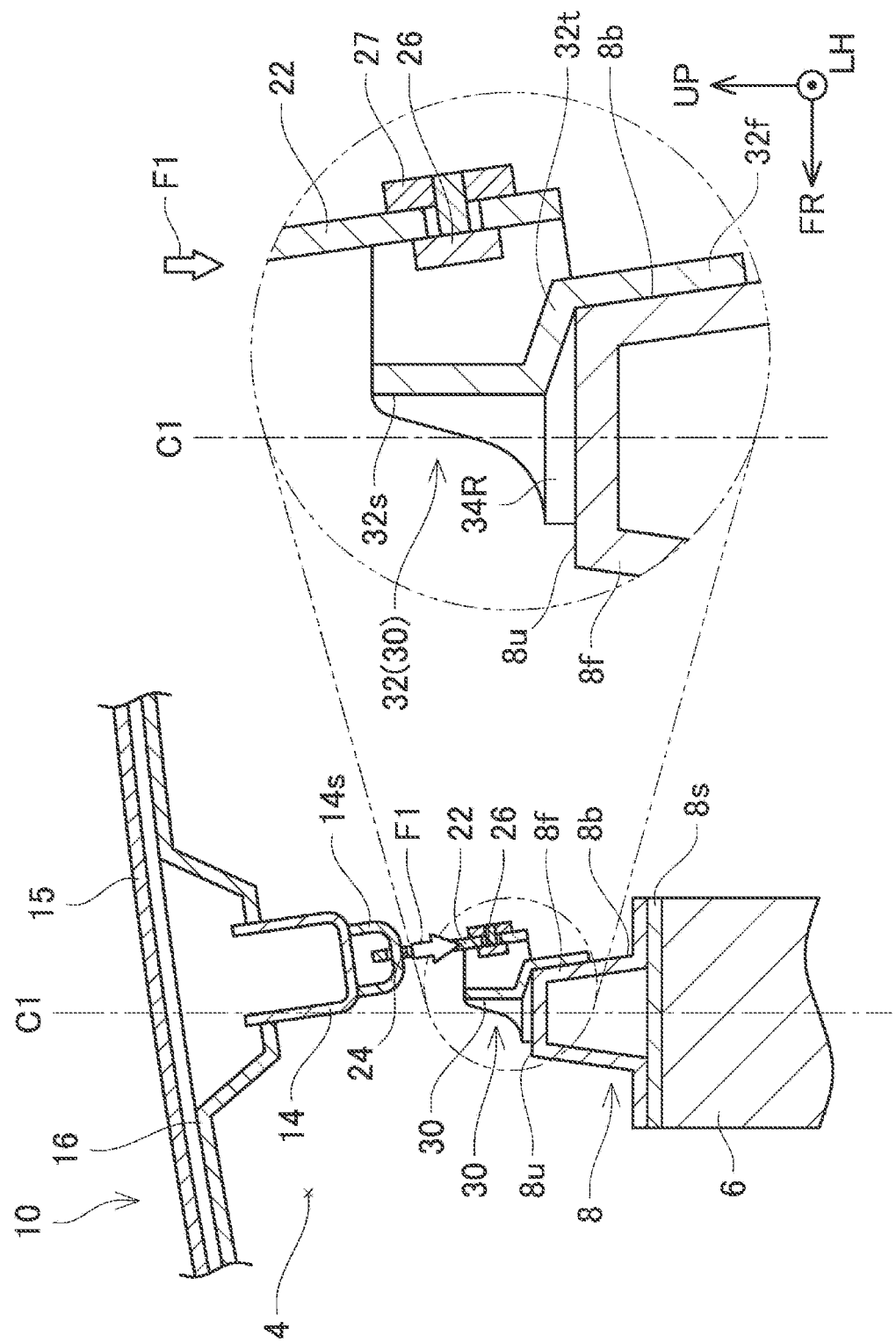
FIG. 3 is a cross-sectional view taken along line in FIG. 2.

FIG. 3 is a cross-sectional view taken along line III-III in FIG. 2. The hood 10 includes an outer panel 15 and an inner panel 16. The outer panel 15 is a sheet metal part that makes up an outer profile of the hood 10. The inner panel 16 is a sheet metal part that reinforces an inner side of the outer panel 15, and a striker base 14 is provided at a front portion thereof. A striker 14s is provided at a lower end of the striker base 14. The striker 14s is formed of a pipe having a circular cross-section, and has a letter-U shape in side view. When the hood lock 22 turns about the pin 26 in a state in which the hood 10 positioned at the closed position L2, a lower end of the striker 14s is positioned within the notch 24 of the hood lock 22. As a result, upward movement of the striker 14s is restricted, and the hood 10 is locked at the closed position L2.

The hood lock 22 extends toward the striker 14s, at a position rearward from the radiator support upper crossmember 8. That is to say, the hood lock 22 is positioned rearward from a center C1 of the radiator support upper crossmember 8 in the front-rear direction (i.e., the right-left direction in the plane of the drawing in FIG. 3).

The radiator support upper crossmember 8 is a sectioned material of which the cross-sectional shape illustrated in FIG. 3 extends in the right-left direction. The radiator support upper crossmember 8 includes a first member 8f and a second member 8s. The first member 8f has a cross-sectional shape protruding upward at the middle in the front-rear direction. That is to say, the first member 8f has a hat-shaped cross-section, and is open below. The second member 8s is a flat plate-shaped sheet metal part that is welded to a lower face of the first member 8f. That is to say, the second member 8s covers the first member 8f from below. As a result, the radiator support upper crossmember 8 has a closed cross-section. Thus, rigidity of the radiator support upper crossmember 8 is improved. In particular, when the hood 10 moves from the open position L1 to close the front compartment 4, a closing load F1 including the weight of the hood 10 itself is conveyed to the radiator support upper crossmember 8 via the striker 14s and the hood lock module 20. Forming a closed cross-section by the first member 8f and the second member 8s of the radiator support upper crossmember 8 enables durability of the radiator support upper crossmember 8 with respect to the load when the hood 10 is closed to be improved.

An enlarged view of the bracket plate 30 of the hood lock module 20 is illustrated on the right side in FIG. 3. The main unit 32 of the bracket plate 30 includes a first region 32f, a second region 32s, and an inclined portion 32t. The first region 32f is fixed to a rear face 8b of the radiator support upper crossmember 8 by welding. The second region 32s extends upward above the first region 32f. The second region 32s is positioned rearward from the center C1. As described above, the hood lock 22 is fixed to the first region 32f by two screws 28. The regions 32f, 32s are connected by the inclined portion 32t. The inclined portion 32t is displaced forward the further upward. That is to say, the inclined portion 32t is positioned forward the further toward the second region 32s. As a result, the second region 32s is positioned upward from the upper face 8u of the radiator support upper crossmember 8.

Further, the extending portion 34R on the right side extends forward from the second region 32s. As a result, the extending portion 34R on the right side extends from the second region 32s to the upper face 8u of the radiator support upper crossmember 8. Although not illustrated in the enlarged view in FIG. 3, the extending portions 34L, 34R have mutually symmetrical shapes, and accordingly the extending portion 34L on the left side also extends from the second region 32s to the upper face 8u of the radiator support upper crossmember 8, in the same way.

As described above, the closing load F1 is applied to the hood lock module 20 when the hood 10 moves to the closed position L2. By providing the main unit 32 of the bracket plate 30 with the second region 32s extending upward above the upper face 8u of the radiator support upper crossmember 8 and the inclined portion 32t displaced forward the further upward, the closing load F1 is conveyed to the upper face 8u of the radiator support upper crossmember 8, via the second region 32s and the inclined portion 32t. Conveying the closing load F1 to the radiator support upper crossmember 8 having high rigidity, can reduce damage to the hood lock module 20 due to the closing load F1. As a result, durability of the hood lock module 20 with respect to the closing load F1 of the hood 10 is improved. Further, at this time, the closing load F1 is also conveyed to the upper face 8u of the radiator support upper crossmember 8 via the extending portions 34L, 34R. The main unit 32 of the hood lock module 20 distributes the closing load F1 to the second region 32s and the inclined portion 32t, and to the extending portions 34L, 34R so that the closing load F1 is conveyed to the upper face 8u of the radiator support upper crossmember 8. As a result, the durability of the hood lock module 20 and the radiator support upper crossmember 8 with respect to the closing load F1 of the hood 10 is improved.

As described above, the hood lock module 20 is required to have durability with respect to the closing load F1 of the hood 10. Now, as one of collision tests performed on the vehicle 100, there is known a test in which an impactor H1, which is spherical, is made to collide with the hood 10 as illustrated in FIG. 4, and the collision reaction force acting on the impactor H1 is measured. In this test, reduction in the collision reaction force acting on the impactor H1 is required.

The hood 10 is inclined so as to be displaced downward the further forward. Accordingly, when the impactor H1 collides with the hood 10 from above the hood 10, the impactor H1 moves obliquely in a vehicle-rearward direction (i.e., rightward in the plane of the drawing in FIG. 4) with respect to the downward direction, while applying a collision load F2 to the hood 10, as illustrated in FIG. 4. As a result, the hood 10 deforms downward, starting at an inflection point P1.

The impactor H1 enters the front compartment 4 while deforming the hood 10. As a result, the impactor H1 conveys the collision load F2 to the hood lock 22 via the hood 10. Now, as described above, the hood lock 22 is positioned rearward from the center C1 of the radiator support upper crossmember 8. Accordingly, when the collision load F2 is conveyed, the hood lock 22 is displaced so as to tilt rearward, along with the radiator support upper crossmember 8, as indicated by arrow R2 in FIG. 4. That is to say, the hood lock 22 and the radiator support upper crossmember 8 turn in the direction of arrow R2 under the collision load F2.

This enables the impactor H1 to be displaced beyond the hood lock 22 and further into the front compartment 4. As a result, energy that causes the impactor H1 to be displaced gradually decreases. As described above, the radiator support upper crossmember 8 has high rigidity, in order to improve the durability of the hood 10 with respect to the closing load F1. In an arrangement in which the hood lock 22 were positioned forward of the center C1 of the radiator support upper crossmember 8, the collision load F2 could be conveyed to the radiator support upper crossmember 8 via the hood lock 22. In this case, the radiator support upper crossmember 8 having high rigidity would forcibly stop the displacement of the impactor H1. As a result, a large collision reaction force would instantaneously act on the impactor H1.

In the vehicle 100 disclosed in the present specification, the hood lock 22 is positioned rearward of the center C1 of the radiator support upper crossmember 8, and accordingly the hood lock 22 is displaced so as to be tilted rearward by the collision load F2. As a result, the impactor H1 can be further displaced beyond the hood lock 22, and accordingly the energy that causes the impactor H1 to be displaced gradually decreases. As a result, the collision reaction force measured by the impactor H1 can be reduced.

Also, as described above, the hood lock 22 is fixed to the rear face 8b of the radiator support upper crossmember 8 via the bracket plate 30. Accordingly, when the collision load F2 is applied to the hood lock 22 from forward of the vehicle, the bracket plate 30 is readily separated from the rear face 8b of the radiator support upper crossmember 8. Thus, the collision reaction force acting on the impactor H1 is further reduced.

Although a specific example of the technology disclosed in the present specification is described in detail above, this is only exemplary and is not intended to limit the scope of the claims. The technology described in the claims includes various modifications and alterations of the specific example illustrated above. Modifications of the above embodiment will be described below.

First Modification

The hood lock 22 may be fixed to the rear face 8b of the radiator support upper crossmember 8 via the base plate 27. That is to say, an arrangement may be made in which the hood lock module 20 does not have the bracket plate 30.

Second Modification

An arrangement may be made in which the base plate 27 does not have the extending portions 34L, 34R. Also, in another modification, the extending portions 34L, 34R may be fixed to a front face of the radiator support upper crossmember 8.

Third Modification

An arrangement may be made in which the main unit 32 of the bracket plate does not have the inclined portion 32t. That is to say, the main unit 32 may have a shape extending linearly from the first region 32f. In this case, the extending portions 34L, 34R may extend from the first region 32f to the upper face 8u of the radiator support upper crossmember 8.

Fourth Modification

An arrangement may be made in which the first member 8f of the radiator support upper crossmember 8 does not have a hat-shaped cross-section. In another modification, an arrangement may be made in which the radiator support upper crossmember 8 does not have the second member 8*s*.

The technical elements described in the present specification or drawings exhibit technical usefulness alone or in various combinations, and are not limited to the combinations described in the claims at the time of filing. Also, the technology exemplified in the present specification or in the drawings may achieve a plurality of objects at the same time, and has technical utility by achieving one of such objects.

What is claimed is:

1. A vehicle comprising:
a vehicle body that includes a front compartment;
a radiator that is disposed in the front compartment;
a radiator support upper crossmember that makes up part of the vehicle body and that also extends in a right-left direction along an upper edge of the radiator;
a hood that is pivotably linked to the vehicle body and that is movable between an open position for opening the front compartment and a closed position for closing the front compartment; and
a hood lock that is fixed to the radiator support upper crossmember and that also locks the hood in the closed position, wherein the hood lock is positioned rearward of a center of the radiator support upper crossmember in a front-rear direction.

2. The vehicle according to claim 1, wherein the hood lock is fixed to a rear face of the radiator support upper crossmember via a bracket plate.

3. The vehicle according to claim 2, wherein:
the bracket plate includes a main unit that extends in an up-down direction, and a pair of extending portions in which one of the extending portions extends forward from the main unit on one side of the hood lock in the right-left direction and another one of the extending portions extends forward from the main unit on another side of the hood lock in the right-left direction; and
the extending portions are fixed to an upper face of the radiator support upper crossmember.

4. The vehicle according to claim 3, wherein:
the main unit of the bracket plate includes a first region that is fixed to the rear face of the radiator support upper crossmember, a second region that is positioned above the first region and also to which the hood lock is fixed, and an inclined portion interposed between the first region and the second region;
the inclined portion is displaced forward the further toward the second region such that the second region is positioned above the radiator support upper crossmember; and
the extending portions extend from the second region to the upper face of the radiator support upper crossmember.

5. The vehicle according to claim 1, wherein the radiator support upper crossmember includes a first member with a hat-shaped cross-section, a bottom of the first member being open, and a second member closing the hat-shaped cross-section from below the first member.

6. The vehicle according to claim 1, wherein the hood lock is fixed to a rear face of the radiator support upper crossmember via a base plate.

7. The vehicle according to claim 2, wherein:
the bracket plate includes a main unit that extends in an up-down direction, and a pair of extending portions in which one of the extending portions extends forward from the main unit on one side of the hood lock in the right-left direction and another one of the extending portions extends forward from the main unit on another side of the hood lock in the right-left direction; and
the extending portions are fixed to a front face of the radiator support upper crossmember.

* * * * *